United States Patent
Liang et al.

(10) Patent No.: US 12,078,824 B2
(45) Date of Patent: Sep. 3, 2024

(54) DIFFUSIVE OPTICAL DEVICE

(71) Applicant: VIAVI Solutions Inc., San Jose, CA (US)

(72) Inventors: Kangning Liang, Santa Rosa, CA (US); Jaroslaw Zieba, Santa Rosa, CA (US); Tasso Sales, Pittsford, NY (US)

(73) Assignee: VIAVI Solutions Inc., Chandler, AZ (US)

( * ) Notice: Subject to any disclaimer, the term of this patent is extended or adjusted under 35 U.S.C. 154(b) by 515 days.

(21) Appl. No.: 17/197,799

(22) Filed: Mar. 10, 2021

(65) Prior Publication Data

US 2022/0291426 A1    Sep. 15, 2022

(51) Int. Cl.
*G02B 5/02* (2006.01)
*G02B 1/04* (2006.01)

(52) U.S. Cl.
CPC .............. *G02B 5/021* (2013.01); *G02B 1/04* (2013.01); *G02B 5/0273* (2013.01)

(58) Field of Classification Search
CPC ........ G02B 5/021; G02B 5/0273; G02B 5/02; G02B 5/0205; G02B 5/0215–0247; G02B 5/0263; G02B 5/0278; G02B 5/0294; G02B 1/04
See application file for complete search history.

(56) References Cited

U.S. PATENT DOCUMENTS

| | | | |
|---|---|---|---|
| 2011/0298361 A1* | 12/2011 | Matsunaga | G02B 5/0242 313/504 |
| 2016/0109625 A1 | 4/2016 | Guimard et al. | |
| 2016/0116647 A1* | 4/2016 | Masson | G02B 5/3058 359/207.9 |
| 2017/0131559 A1* | 5/2017 | Sitter | G02B 27/4272 |
| 2019/0353997 A1* | 11/2019 | Hsu | H04N 9/3161 |

(Continued)

FOREIGN PATENT DOCUMENTS

| | | |
|---|---|---|
| CN | 109065600 A | 12/2018 |
| JP | H08279189 A | 10/1996 |

(Continued)

OTHER PUBLICATIONS

Extended European Search Report for Application No. EP21192552. 4, mailed on Jun. 24, 2022, 12 pages.

(Continued)

*Primary Examiner* — Stephone B Allen
*Assistant Examiner* — Adam W Booher
(74) *Attorney, Agent, or Firm* — Harrity & Harrity, LLP

(57) ABSTRACT

In some implementations, a diffusive optical device includes a glass substrate; a first polymer layer disposed on a first surface of the glass substrate; and a second polymer layer disposed on the first polymer layer. A refractive index of the first polymer layer may be different than a refractive index of the second polymer layer. The first surface of the glass substrate may comprise a central region and a margin region, wherein the first polymer layer is disposed on the central region and not the margin region. The first polymer layer may include a plurality of adhesion promoter molecules that causes the second polymer layer to bond to the glass substrate, wherein at least one adhesion promoter molecule, of the plurality of adhesion promoter molecules, comprises a molecularly flexible spacer.

20 Claims, 8 Drawing Sheets

(56) References Cited

U.S. PATENT DOCUMENTS

| | | | |
|---|---|---|---|
| 2020/0071578 A1* | 3/2020 | Huo | C09J 5/02 |
| 2020/0096854 A1* | 3/2020 | Schiavoni | B32B 27/34 |
| 2021/0033759 A1* | 2/2021 | R. M. Sales | G02B 5/0221 |
| 2021/0223452 A1 | 7/2021 | Zhou | |

FOREIGN PATENT DOCUMENTS

| | | |
|---|---|---|
| JP | 4197638 B2 | 12/2008 |
| WO | 2020120638 A2 | 6/2020 |

OTHER PUBLICATIONS

Partial European Search Report for Application No. EP21192552, mailed on Mar. 18, 2022, 13 pages.

\* cited by examiner

DIFFUSIVE OPTICAL DEVICE

BACKGROUND

An optical diffuser may scatter light that passes through the optical diffuser by refracting the light at a range of angles as the light exits from an output surface of the optical diffuser.

SUMMARY

In some implementations, a diffusive optical device includes a glass substrate; a first polymer layer disposed on a first surface of the glass substrate; and a second polymer layer disposed on the first polymer layer, wherein: a refractive index of the first polymer layer is different than a refractive index of the second polymer layer, and the first polymer layer includes a plurality of adhesion promoter molecules that causes the second polymer layer to bond to the glass substrate, wherein at least one adhesion promoter molecule, of the plurality of adhesion promoter molecules, comprises a molecularly flexible spacer.

In some implementations, a diffusive optical device includes a glass substrate; a first polymer layer disposed on a first surface of the glass substrate; and a second polymer layer disposed on the first polymer layer, wherein: a refractive index of the first polymer layer is different than a refractive index of the second polymer layer, and the first surface of the glass substrate comprises a central region and a margin region, wherein the first polymer layer is disposed on the central region and not the margin region.

In some implementations, a method includes depositing a polymer layer that includes first adhesion promoter molecules and second adhesion promoter molecules on a surface of a glass substrate; and causing hydrolysis of the first adhesion promoter molecules to produce an acid catalyst, wherein production of the acid catalyst causes acid-catalyzed hydrolysis of the second adhesion promoter molecules, and wherein the acid-catalyzed hydrolysis of the second adhesion promoter molecules causes at least one of the second adhesion promoter molecules to include a molecularly flexible spacer.

DETAILED DESCRIPTION

Figure 1A:
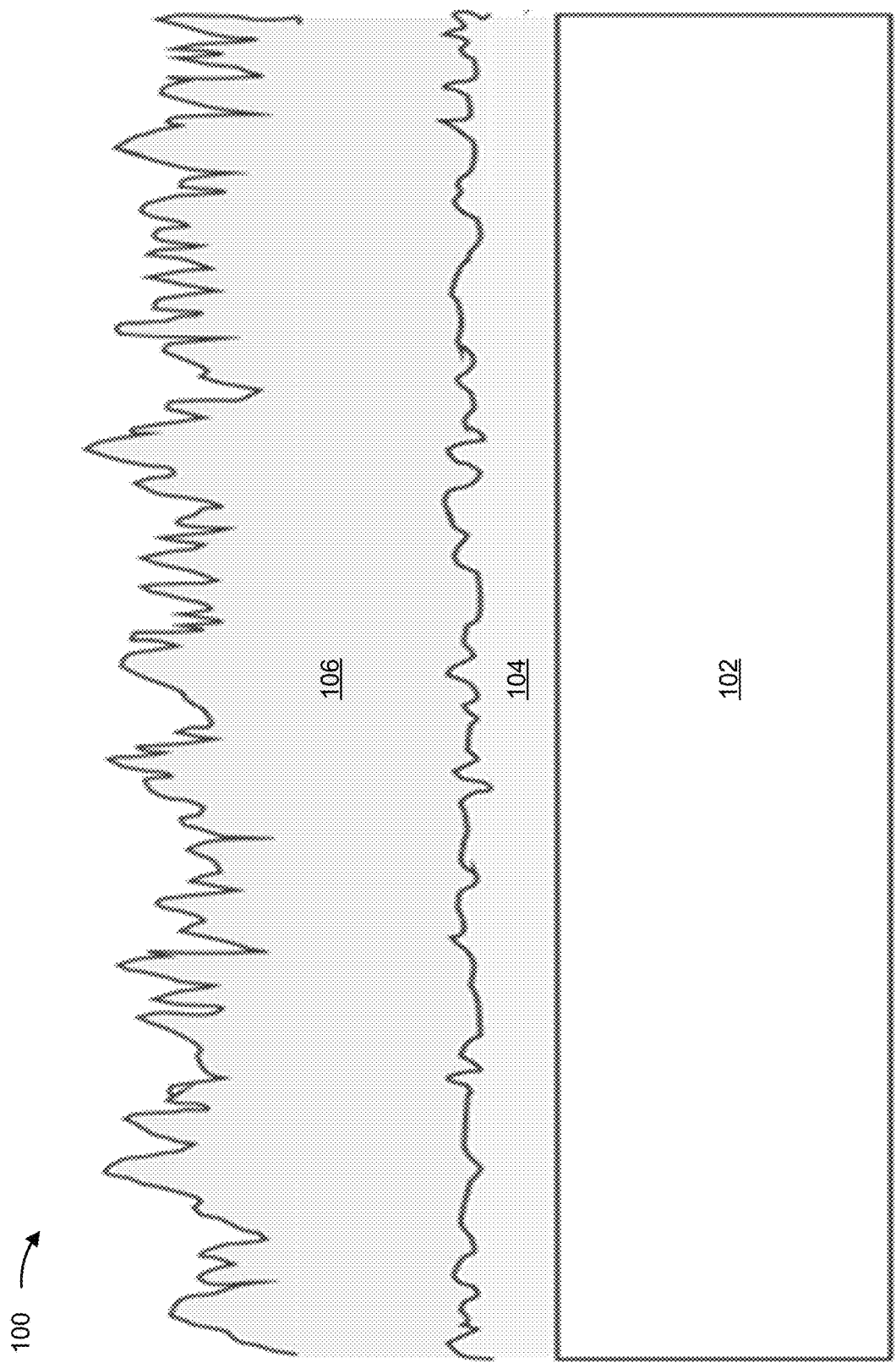
FIGS. 1A-1F are diagrams related to an example diffusive optical device described herein.

The following detailed description of example implementations refers to the accompanying drawings. The same reference numbers in different drawings may identify the same or similar elements.

A conventional diffusive optical device includes a single polymer layer disposed on a substrate. A typical polymer layer has a refractive index ranging from 1.4 to 1.6, which does not adequately spread light (e.g., does not refract light at a sufficiently broad range of angles) to satisfy some high-diffusion applications. In some cases, inorganic nanoparticles with a high refractive index (e.g., titanium dioxide, zirconium oxide, zinc sulfide, zinc oxide, and/or the like) may be added to the single polymer layer to increase the refractive index of the polymer; however, addition of the inorganic nanoparticles degrades one or more characteristics (e.g., mechanical characteristics, physical characteristics, chemical characteristics, and/or optical characteristics) of the polymer and therefore impacts a performance of the diffusive optical device (e.g., a durability performance, a temperature performance, an optical performance, and/or the like).

Some implementations described herein provide a diffusive optical device that includes a first polymer layer disposed on a surface of a substrate and a second polymer layer disposed on the first polymer layer. The combination of the first polymer layer and the second polymer layer may be referred to as a bilayer polymer structure (e.g., that is disposed on the surface of the substrate). The first polymer layer may have a refractive index that is different than a refractive index of the second polymer layer, which causes a light beam to bend (e.g., refract) more when exiting from the bilayer polymer structure of the diffusive optical device than when exiting from a single polymer layer of a conventional diffusive optical device. The diffusive optical device therefore provides a greater range of angles at which the diffusive optical device scatters light as compared to that provided by a conventional diffusive optical device. Accordingly, the diffusive optical device provides an improved diffusive performance without the addition of inorganic nanoparticles (that would otherwise impact the diffusive performance or other performance characteristics of the diffusive optical device).

In some implementations, the bilayer polymer structure may be disposed on a central area of the surface of the substrate, which allows one or more margin regions of the surface of the substrate to be free of any polymer layers. This facilitates dicing of the substrate when manufacturing the diffusive optical device (e.g., by dicing only the substrate rather than dicing the substrate, the first polymer layer, and the second polymer layer), which prevents structural defects from developing in the substrate and/or the bilayer polymer structure. This also promotes safe handling of the diffusive optical device (e.g., post-manufacturing) by providing a location on the substrate for the diffusive optical device to be held (e.g., for assembly into or with another device) without contacting the bilayer polymer structure.

Further, in some implementations, the diffusive optical device described herein may include one or more coatings on an additional surface of the substrate (e.g., an opposite surface of the substrate on which the bilayer polymer structure is disposed). The one or more coatings may facilitate an electrical connection of the diffusive optical device to another device and/or may facilitate additional control of light that enters the diffusive optical device.

In some implementations, the first polymer layer may include a plurality of regions that are respectively configured to pass light associated with particular characteristics, to control light to have particular characteristics, and/or the like. For example, a region may be configured to pass light associated with a particular wavelength range, to cause light that passes through the region to have a particular polarity, and/or to cause light that passes through the region to have a particular light intensity. In this way, the plurality of regions of the first polymer layer facilitate control of light that propagates through the first polymer layer, which is not possible using a single, homogeneous polymer layer of a conventional diffusive optical device.

Further, the first polymer layer may include a plurality of adhesion promoter molecules that cause the first polymer layer to bond to the substrate and/or the second polymer layer. In some implementations, an adhesion promoter molecule may include a molecularly flexible spacer that is configured to move (e.g., rotate, bend, and/or the like) while maintaining a structural integrity of the adhesion promoter molecule. In this way, the molecularly flexible spacer accommodates relative movement between the substrate and the second polymer layer while facilitating the bond between the substrate and the second polymer layer provided by the adhesion promoter molecule. Accordingly, the first polymer layer provides improved adhesion properties (e.g., between the substrate and the second polymer layer) as compared to a polymer layer that does not comprise adhesion promoter molecules and molecularly flexible spacers.

FIGS. 1A-1F are diagrams related to an example diffusive optical device 100 described herein. FIG. 1A is a diagram of a side view of an example configuration of the diffusive optical device 100. As shown in FIG. 1A, the diffusive optical device 100 may include a substrate 102, a first polymer layer 104, and a second polymer layer 106. The substrate 102 may be fabricated of any suitable material that allows light associated with a particular wavelength (e.g., visible light, ultraviolet (UV) light, and/or infrared (IR) light, among other examples) to pass through the substrate 102. The substrate 102 may include or may be formed using glass (e.g., a fused silica glass, and/or a borofluid glass, among other examples), a polymer (e.g., a polymer substrate, a polymer dye, and/or a polymeric matrix, among other examples), and/or the like. The first polymer layer 104 may comprise a polymer (e.g., a low refractive index polymer), such as a polymer of silsesquioxane, silicone, fluorocarbon, and/or hydrocarbon. The second polymer layer 106 may comprise a polymer (e.g., a high refractive index polymer), such as a polymer comprising aromatic groups (e.g., benzene and/or naphthalene rings), a polymer comprising heavy atoms (e.g., sulfur and/or halogens), and/or a polymer composite containing high refractive nanoparticles, such as titanium oxide and/or zirconium oxide. The first polymer layer 104 and/or the second polymer layer 106 may be formed using one or more processes described herein in relation to FIGS. 2A-2B.

The first polymer layer 104 may have a refractive index that is different than a refractive index of the second polymer layer 106. For example, the refractive index of the first polymer layer 104 may be greater than the refractive index of the second polymer layer 106 (or vice versa). In one example, the refractive index of the first polymer layer 104 may be within a range of 1.3 to 1.5 (e.g., greater than or equal to 1.3 and less than 1.5) and the refractive index of the second polymer layer 106 may be with a range of 1.5 to 1.9 (e.g., greater than or equal to 1.5 and less than 1.9).

The first polymer layer 104 may be disposed on the substrate 102 (e.g., a top surface of the substrate 102 as shown in FIG. 1A). The second polymer layer 106 may be disposed on the first polymer layer 104 (e.g., a top surface of the first polymer layer 104 as shown in FIG. 1A). As further shown in FIG. 1A, the first polymer layer 104 may include a non-uniform output surface (e.g., the "jagged" top surface of the first polymer layer 104) that is configured to facilitate diffraction of light that propagates from the non-uniform output surface of the first polymer layer 104 to the second polymer layer 106. The second polymer layer 106 may include a non-uniform output surface (e.g., the jagged top surface of the second polymer layer 106) that is configured to facilitate diffraction of light that propagates from the non-uniform output surface of the second polymer layer 106 to free space 108 (e.g., air).

Figure 1B:
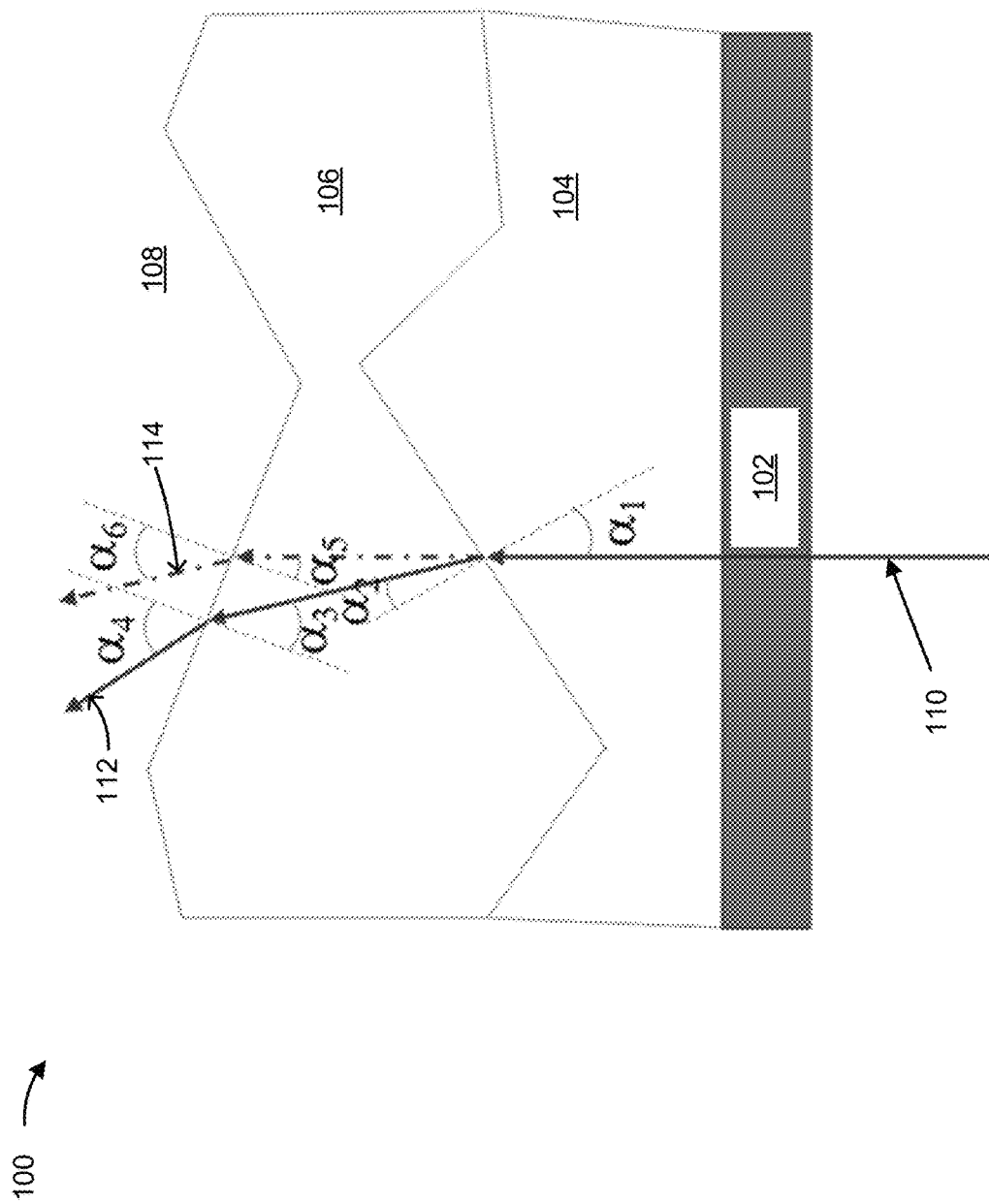

FIG. 1B is a diagram of a light beam 110 propagating through an example configuration of the diffusive optical device 100. In this example, the refractive index of the second polymer layer 106 is greater than the refractive index of the first polymer layer 104, which is greater than the refractive index of free space 108 (e.g., air). The light beam 110 may propagate via a path 112 (e.g., indicated by the solid arrows) through the substrate 102, the first polymer layer 104, the second polymer layer 106, and into free space.

As shown in FIG. 1B, the light beam 110 may enter the substrate 102 via an input surface of the substrate 102 (e.g., the bottom surface of the substrate 102). In some implementations, the light beam 110 may emit from a laser device, such as a vertical cavity surface emitting laser (VCSEL) device and may be aimed to enter the substrate 102 via the input surface of the substrate 102. As shown in FIG. 1B, the light beam 110 may enter the input surface of the substrate 102 at a perpendicular angle, which causes the light beam 110 to enter the substrate 102 without bending (e.g., without refracting).

The light beam 110 may propagate through the substrate 102 and may exit the substrate 102 via an output surface of the substrate 102 (e.g., a top surface of the substrate 102). The light beam 110 then may enter the first polymer layer 104 via an input surface of the first polymer layer 104 (e.g., the bottom surface of the first polymer layer 104). As shown in FIG. 1B, an interface of the output surface of the substrate 102 and the input surface of the first polymer layer 104 may be perpendicular to a trajectory of the light beam 110 (e.g., after propagating through the substrate 102), which causes the light beam 110 to enter the substrate 102 without bending (e.g., without refracting).

The light beam 110 may propagate through the first polymer layer 104 and may exit the first polymer layer 104 via an output surface of the first polymer layer 104 (e.g., the top surface of the first polymer layer 104). The light beam 110 then may enter the second polymer layer 106 via an input surface of the second polymer layer 106 (e.g., the bottom surface of the second polymer layer 106). As shown in FIG. 1B, the output surface of the first polymer layer 104 may be non-uniform. Accordingly, the light beam 110 may exit the first polymer layer 104 at a region of the output surface of the first polymer layer 104 at an angle of $\alpha_1$ (e.g., $\alpha_1$ degrees from a normal line associated with the region of the output surface of the first polymer layer 104). This may cause the light beam 110 to bend (e.g., refract) and to enter the second polymer layer 106 at a corresponding region of the input surface of the second polymer layer 106 at an angle of $\alpha_2$ (e.g., $\alpha_2$ degrees from a normal line associated with the region of the input surface of the second polymer layer 106).

The light beam 110 may propagate through the second polymer layer 106 and may exit the second polymer layer 106 via an output surface of the second polymer layer 106 (e.g., the top surface of the second polymer layer 106) into free space. As shown in FIG. 1B, the output surface of the second polymer layer 106 may be non-uniform. Accordingly, the light beam 110 may exit the second polymer layer 106 at a region of the output surface of the second polymer layer 106 at an angle of $\alpha_3$ (e.g., $\alpha_3$ degrees from a normal line associated with the region of the output surface of the second polymer layer 106). This may cause the light beam 110 to bend (e.g., refract) and to enter free space at an angle of $\alpha_4$ (e.g., $\alpha_4$ degrees from the normal line associated with the region of the output surface of the second polymer layer 106).

Also shown in FIG. 1B is a path 114 (e.g., indicated by the dashed-and-dotted arrows) of the light beam 110 if the light beam 110 were to propagate through a single polymer layer (e.g., a single second polymer layer 106) rather than the first polymer layer 104 and the second polymer layer 106. As shown in FIG. 1B, the light beam 110 would propagate through the single polymer layer and exit the single polymer layer via an output surface of the single polymer layer (e.g., the top surface of the second polymer layer 106) into free space. Accordingly, the light beam 110 would exit the single polymer layer at a region of the output surface of the single polymer layer at an angle of as (e.g., as degrees from a normal line associated with the region of the output surface of the single polymer layer), which would cause the light beam 110 to bend (e.g., refract) and to enter free space at an angle of $\alpha_6$ (e.g., $\alpha_6$ degrees from the normal line associated with the region of the output surface of the single polymer layer).

As shown in FIG. 1B, $\alpha_4$ is greater $\alpha_6$, which indicates that the light beam 110 bends more when propagating through the first polymer layer 104 and the second polymer layer 106 than when propagating through the single polymer layer. Accordingly, the diffusive optical device 100 (e.g., that comprises the first polymer layer 104 and the second polymer layer 106) bends light at greater angles than a conventional diffusive optical device (e.g., that comprises a single polymer layer). The diffusive optical device 100 therefore provides a greater range of angles at which the diffusive optical device 100 scatters light, which provides an improved diffusive performance, as compared to that provided by a conventional diffusive optical device. Alternatively, the light beam 110 may impinge upon the diffusive optical device 100 device so as to propagate through the second polymer layer 106 first and the substrate 102 last, (e.g., depending on optical requirements for diffusing the light beam 110).

Figure 1C:
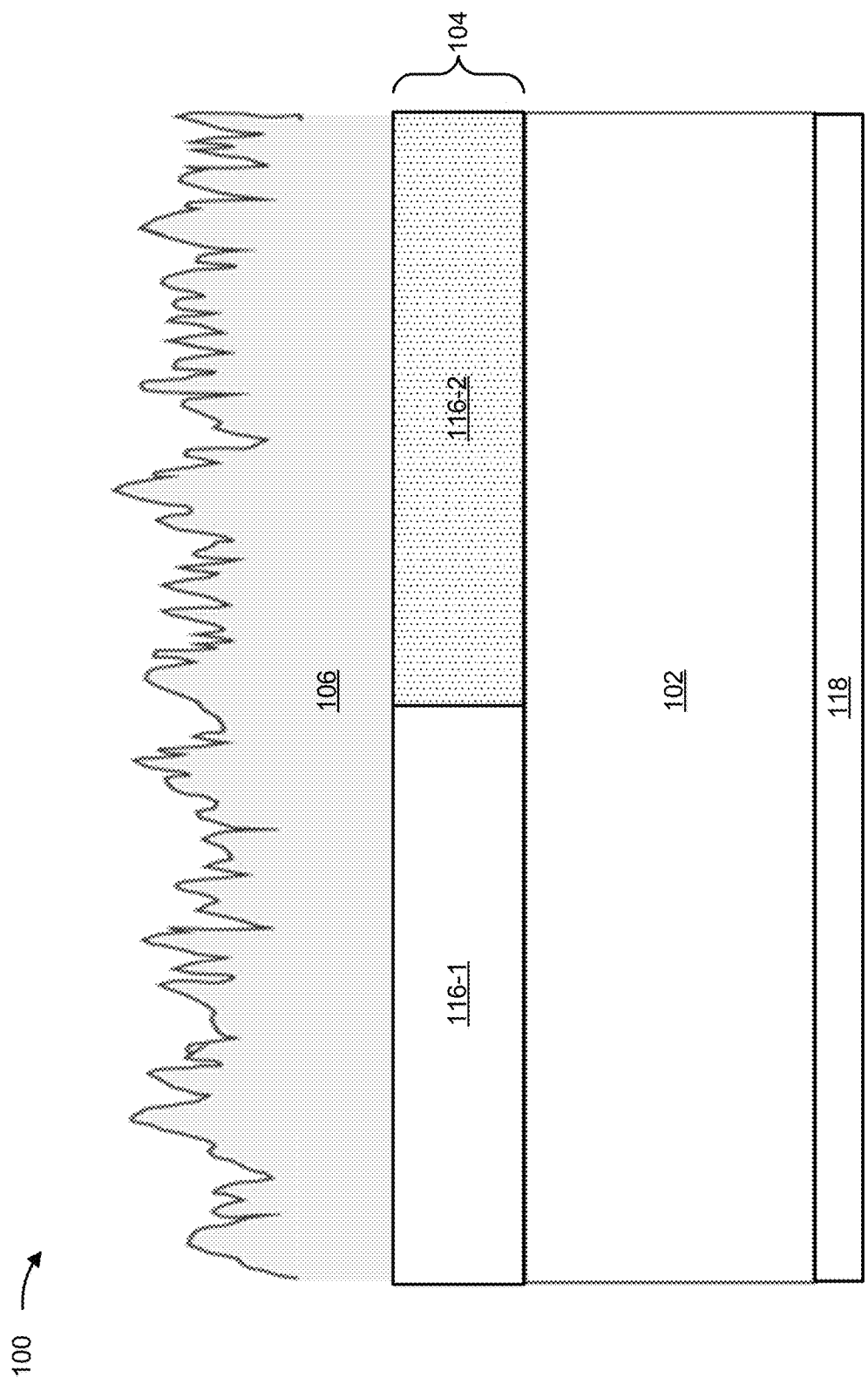

FIG. 1C is a diagram of a side view of another example configuration of the diffusive optical device 100. As shown in FIG. 1C, the diffusive optical device 100 may include the substrate 102, the first polymer layer 104 (e.g., that comprises a plurality of regions 116, shown as regions 116-1 and 116-2), the second polymer layer 106, and/or one or more coatings 118. The first polymer layer 104 may be disposed on a first surface of the substrate 102 (e.g., a top surface of the substrate 102 as shown in FIG. 1C). The second polymer layer 106 may be disposed on the first polymer layer 104 (e.g., respective top surfaces of the plurality of regions 116 of the first polymer layer 104 as shown in FIG. 1C). The one or more coatings 118 may be disposed on a second surface of the substrate 102 (e.g., a bottom surface of the substrate 102 as shown in FIG. 1C).

In some implementations, individual regions 116, of the plurality of regions 116 of the first polymer layer 104, may be configured to pass light associated with particular characteristics, to control light to have particular characteristics, and/or the like. For example, the region 116-1 may be configured to pass light associated with a first wavelength range and the region 116-2 may be configured to pass light associated with a second wavelength range (e.g., that is different than the first wavelength range). As another example, the region 116-1 may be configured to cause light that passes through the region 116-1 to have a first polarity, and the region 116-2 may be configured to cause light that passes through the region 116-2 to have a second polarity (e.g., that is different than the first polarity). In an additional example, the region 116-1 may be configured to cause light that passes through the region 116-1 to have a light intensity within a first light intensity range, and the region 116-2 may be configured to cause light that passes through the region 116-2 to have a light intensity within a second light intensity range (e.g., that is different than the first light intensity range). In some implementations, the first polymer layer 104 may include sets (e.g., one or more) of regions 116 that have a same configuration or characteristic. For example, the first polymer layer 104 may include a set of regions 116-1, a set of regions 116-2, and so on. The sets of regions 116 may be arranged in a uniform pattern (e.g., in a checkered pattern) or in a non-uniform pattern (e.g., a random or pseudo-random pattern). For example, the first polymer layer 104 may include a set of regions 116-1 and a set of regions 116-2 arranged in an alternating pattern. In this way, the plurality of regions 116 of the first polymer layer 104 facilitate control of light that propagates through the first polymer layer 104.

The one or more coatings 118 may include, for example, an electrically conductive coating (e.g., a coating comprising a metal, such as gold (Au), and/or one or more other conductive materials, such as Indium Tin Oxide (ITO)), an anti-reflective coating (e.g., to prevent reflection of light associated with a first particular wavelength range), a reflective coating (e.g., to reflect and/or block light associated with a second particular wavelength range), and/or the like. In this way, the one or more coatings 118 facilitate an electrical connection of the diffusive optical device 100 to another device and/or facilitate control of light that enters the diffusive optical device 100.

Figure 1D:
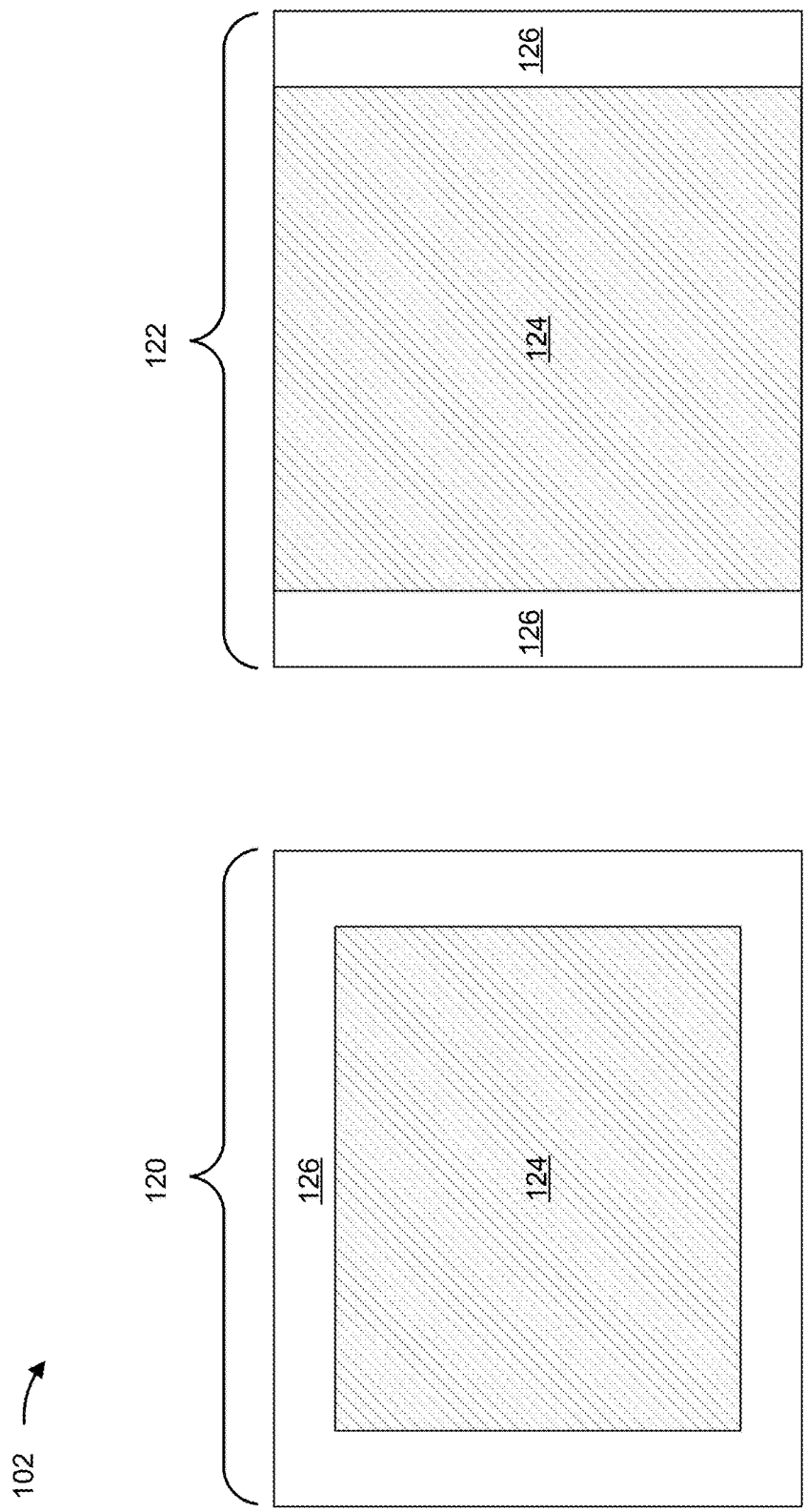

FIG. 1D is a diagram of a top view of example surfaces 120 and 122 of the substrate 102 (e.g., examples of the top surface of the substrate 102 described above in relation to FIGS. 1A-1C) of the diffusive optical device 100. As shown in FIG. 1D, the surface 120 and the surface 122 may each include a central region 124 and one or more margin regions 126. As shown in FIG. 1D for surface 120, the central region 124 may be surrounded by a single margin region 126. Accordingly, an area (e.g., a mathematical area) of the surface 120 is equal to a sum of the respective areas of the central region 124 and the single margin region 126. As shown in FIG. 1D for surface 122, the central region 124 may extend from one edge of the surface 122 to an opposite edge of the surface 122 (e.g., the top and bottom edges of the surface 122) and may be adjacent to two separate margin regions 126 (e.g., that respectively extend to the left and right edges of the surface 122). Accordingly, an area of the surface 122 is equal to a sum of the respective areas of the central region 124 and the two separate margin regions 126.

In some implementations, when the substrate 102 includes the surface 120, the first polymer layer 104 may be disposed on the central region 124 (and not disposed on the single margin region 126). The second polymer layer 106 then may be disposed on the first polymer layer 104, such that the second polymer layer 106 is disposed over the central region 124 (and not disposed over the single margin region 126). Alternatively, when the substrate 102 includes the surface 122, the first polymer layer 104 may be disposed on the central region 124 (and not disposed on the two separate margin regions 126). The second polymer layer 106 then may be disposed on the first polymer layer 104, such that the second polymer layer 106 is disposed over the central region 124 (and not disposed over the two separate margin regions 126). While two example surfaces of the substrate 102 are shown in FIG. 1D, other example surfaces are contemplated, such as a surface that includes only a central region 124 (e.g., an area of the central region 124 is equal to an area of the surface of the substrate), a surface that includes multiple central regions 124 (e.g., separated by at least one margin region 126), and/or the like.

In this way, one or more portions of a surface of the substrate 102 may be free of any polymer layers. This may facilitate dicing of the substrate 102 to manufacture the diffusive optical device 100 (e.g., by dicing only the substrate 102 rather than dicing the substrate 102, the first polymer layer 104, and the second polymer layer 106), which prevents structural defects from developing in the substrate, the first polymer layer 104, and/or the second polymer layer 106. This also promote safe handling of the diffusive optical device 100 during post-manufacturing applications, by providing a location on the substrate 102 for the diffusive optical device 100 to be held (e.g., for assembly into or with another device) without contacting the first polymer layer 104 and/or the second polymer layer 106.

Figure 1E:
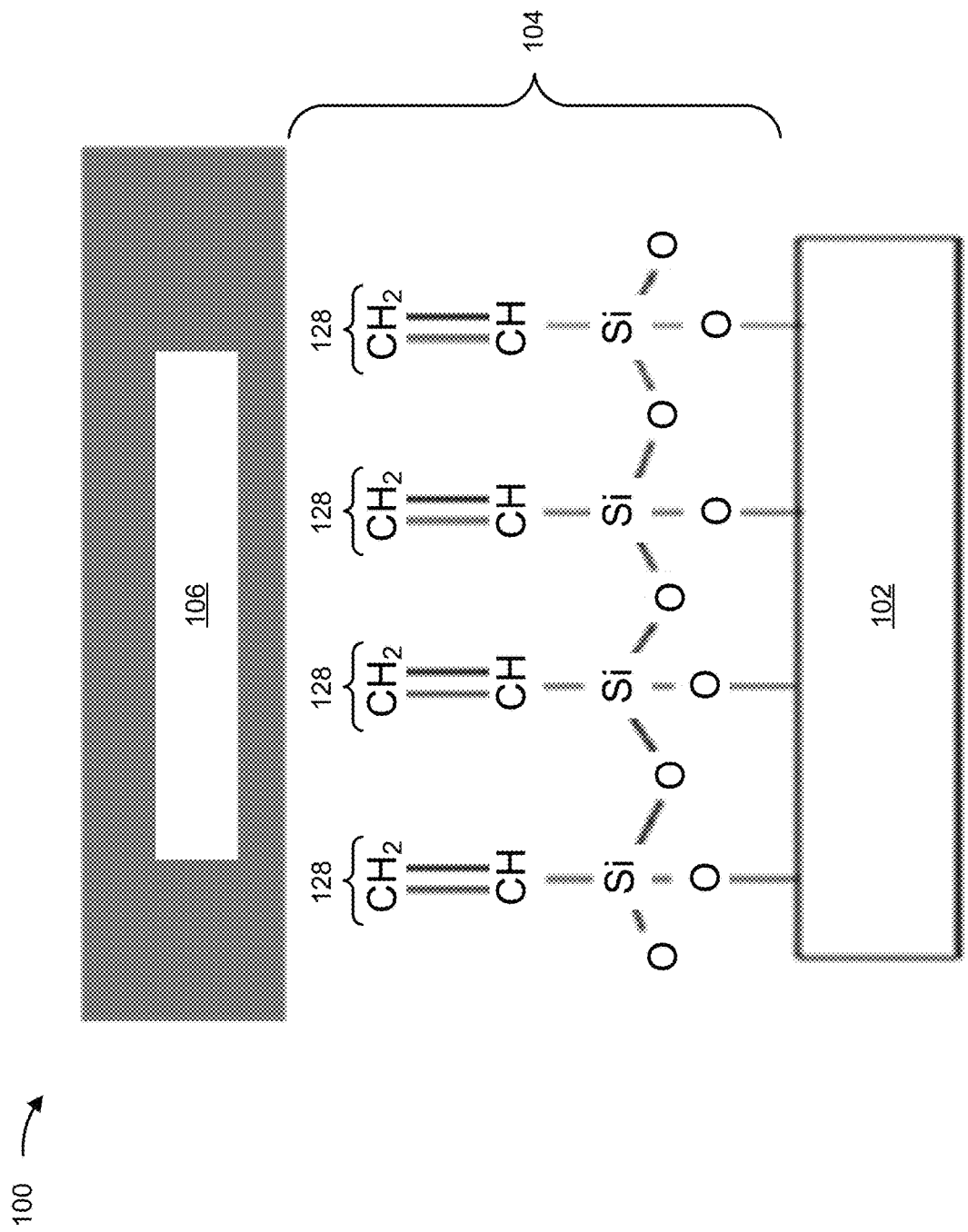
Figure 1F:
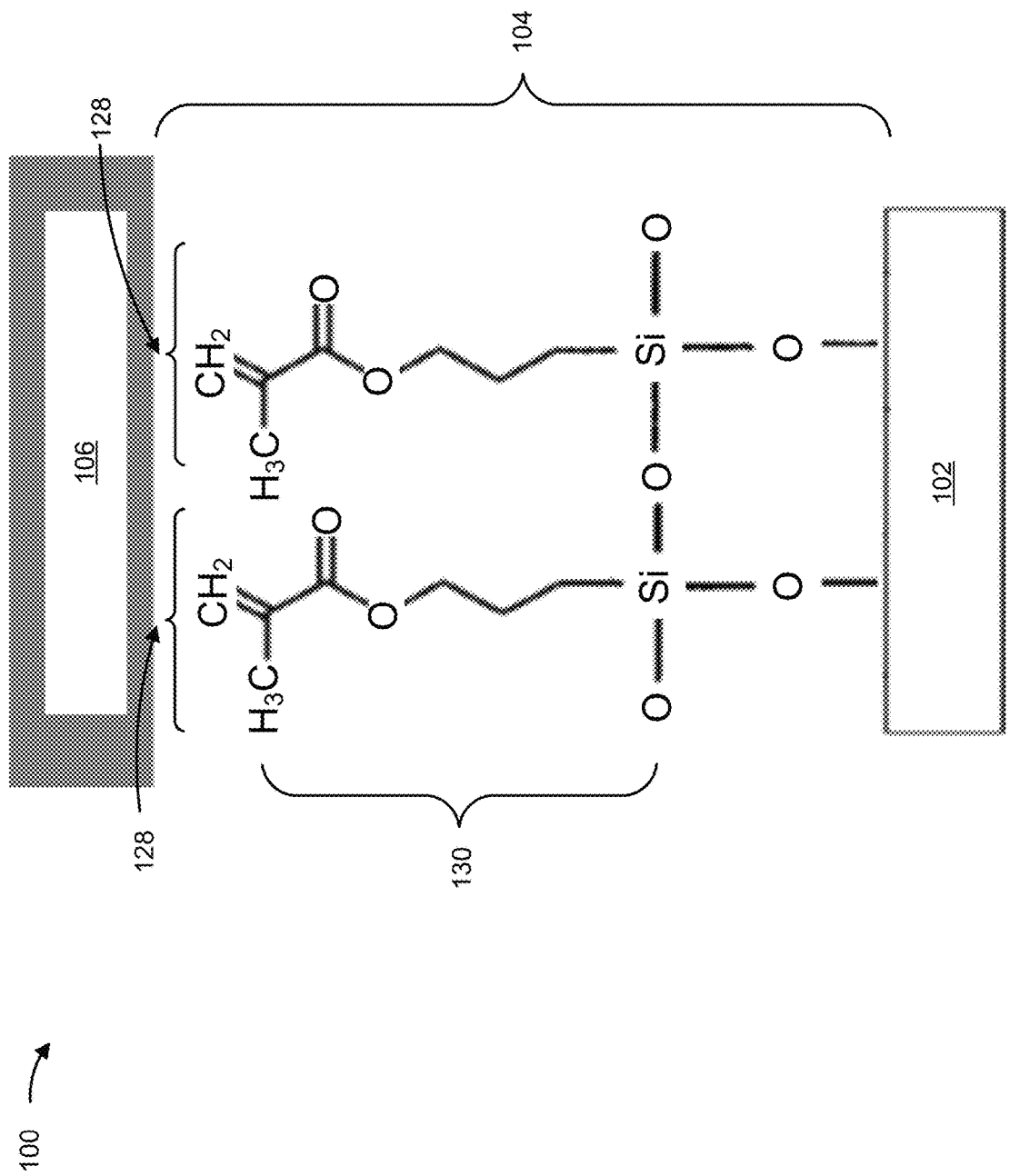

FIGS. 1E-1F are diagrams of example molecular compositions of the first polymer layer 104 of the diffusive optical device 100. In some implementations, the first polymer layer 104 may include a plurality of adhesion promoter molecules 128 that cause the first polymer layer 104 to bond to the substrate 102 and/or the second polymer layer 106. An adhesion promoter molecule 128 may include, for example, one or more molecules from an alkoxysilane group (e.g., mono-alkoxysilane molecules, di-alkoxysilane molecules, tri-alkoxysilane molecules, and/or the like). As another example, as shown in FIG. 1E, an adhesion promoter molecule 128 may include a functional group (e.g., a siloxane group) that causes the first polymer layer 104 to bond to the substrate 102 and/or a functional group (e.g., a methylidene group) that causes the first polymer layer 104 to bond to the second polymer layer 106. In some implementations, an adhesion promoter molecule 128 may include a molecularly flexible spacer 130, such as a molecular chain from an alkyl group, a siloxane group, an alkenyl group, and/or the like. For example, as shown in FIG. 1F, an adhesion promoter molecule 128 may include a five atom molecularly flexible spacer 130 that separates a first functional group (e.g., a siloxane group molecule) of the adhesion promoter molecule 128 that bonds to the substrate 102 and a second functional group (e.g., a methylidene group) of the adhesion promoter molecule 128 that bonds to the second polymer layer 106. The molecularly flexible spacer 130 may be configured to move (e.g., rotate, bend, and/or the like) while maintaining a structural integrity of the adhesion promoter molecule 128. In this way, the molecularly flexible spacer 130 accommodates relative movement between the substrate 102 and the second polymer layer 106 while facilitating the bond between the substrate 102 and the second polymer layer 106 provided by the adhesion promoter molecule 128. Accordingly, the first polymer layer 104 provides improved adhesion properties (e.g., between the substrate 102 and the second polymer layer 106) as compared to a polymer layer that does not comprise adhesion promoter molecules 128 and molecularly flexible spacers 130.

As indicated above, FIGS. 1A-1F are provided as an example. Other examples may differ from what is described with regard to FIGS. 1A-1F.

Figure 2A:
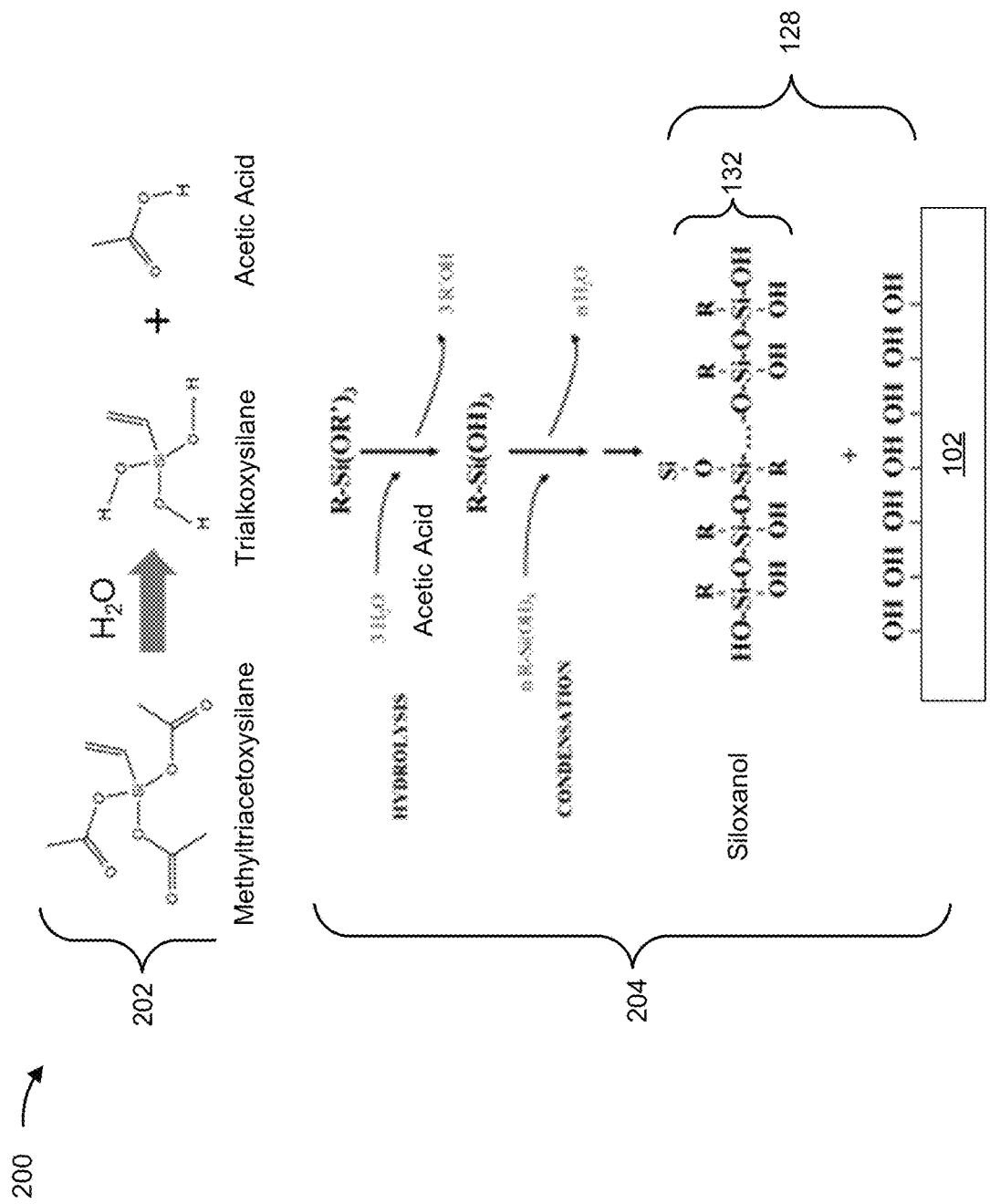
FIGS. 2A-2B are diagrams related to example processes for forming polymer layers of the diffusive optical device described herein.
Figure 2B:
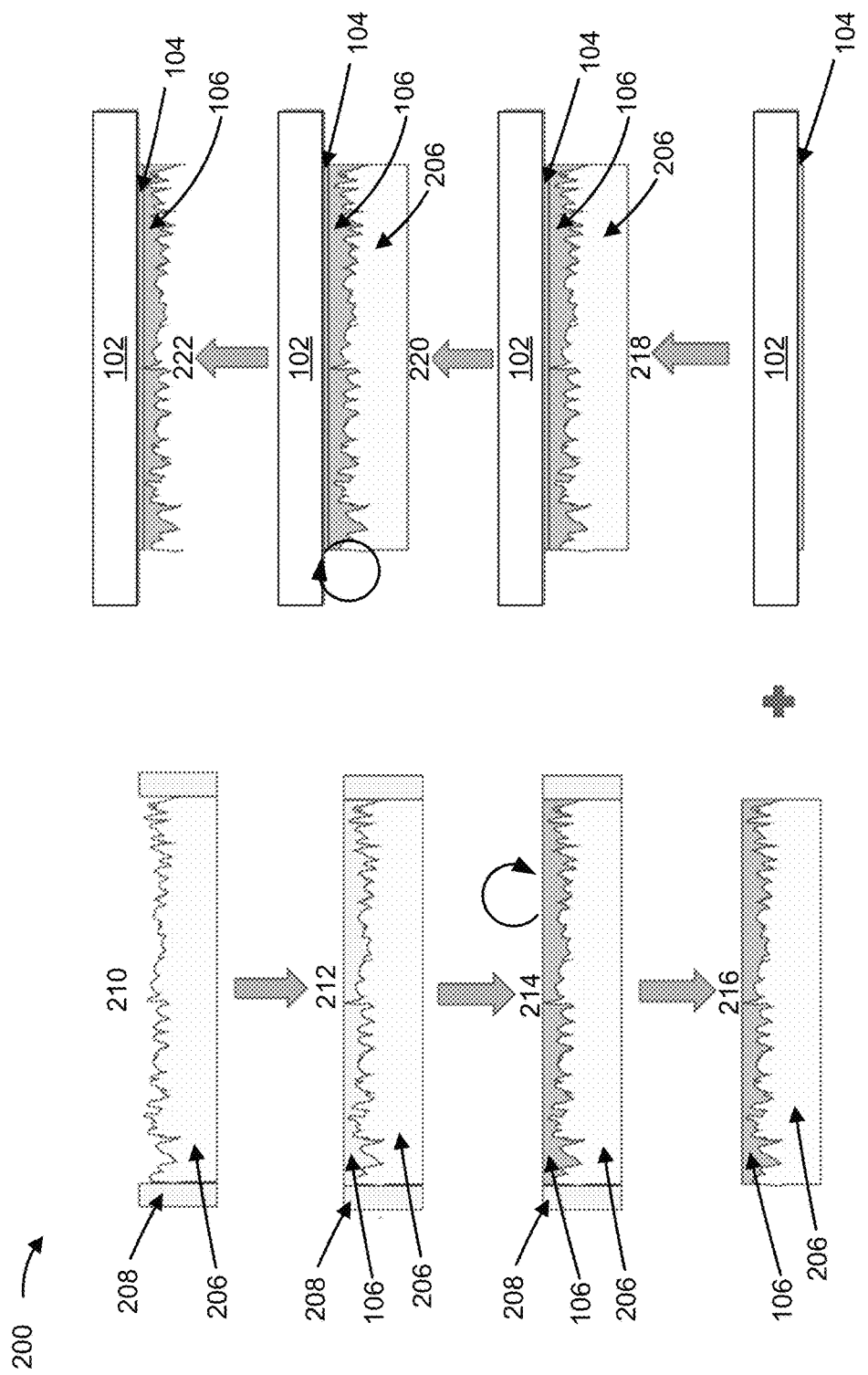

FIGS. 2A-2B are diagrams related to example processes 200 for forming polymer layers of the diffusive optical device 100. FIG. 2A is a diagram related to forming the first polymer layer 104 on the substrate 102. In some implementations, a process to form the first polymer layer 104 may include depositing a polymer layer on a surface (e.g., the top surface) of a substrate. For example, the process may include depositing a polymer layer that includes first adhesion promoter molecules and second adhesion promoter molecules (e.g., adhesion promoter molecules 128) on a surface of the substrate 102. The first adhesion promoter molecules may comprise, for example, molecules from a triacetoxysilane group or a trichlorosilane group and the second adhesion promoter molecules may comprise, for example, molecules from a trialkoxysilane group.

The process may further include causing hydrolysis of the first adhesion promoter molecules, which may produce an acid catalyst. For example, as shown in FIG. 2A, and by reference number 202, the first adhesion promoter molecules may comprise methyltriacetoxysilane and causing hydrolysis of the first adhesion promoter molecules (e.g., by adding water molecules to the polymer layer) generates trialkoxysilane and acetic acid. Further, production of the acid catalyst may cause acid-catalyzed hydrolysis of the second adhesion promoter molecules, which include a molecularly flexible spacer 130 (not shown in FIG. 2A). For example, as shown in FIG. 2A, and by reference number 204, production of the acetic acid may cause acid-catalyzed hydrolysis of the second adhesion promoter molecules that comprise trialkoxysilane functional groups and molecularly flexible spacers 130, which produces siloxanol to form a siloxane network 132 having molecularly flexible spacers 130 of the second adhesion promoter molecules (e.g., adhesion promoter molecules 128). In this way, the first polymer layer 104 may be formed to bond to the substrate 102 and to include adhesion promoter molecules 128 that include molecularly flexible spacers 130.

FIG. 2B is a diagram relating to forming the second polymer layer 106 and assembling the diffusive optical device 100. In some implementations, a process to form the second polymer layer 106 may include attaching a mold 206 to one or more mold frames 208. For example, as shown in FIG. 2B, and by reference number 210, a mold 206 (e.g., that defines a non-uniform surface) is attached to one or more mold frames 208. The process may further include filling the mold 206 with an uncured polymer. For example, as shown in FIG. 2B, and by reference number 212, the mold 206 may be filled with the second polymer layer 106 (e.g., before the second polymer layer 106 is cured). The process may further include curing the polymer, as shown in FIG. 2B, and by reference number 214. For example, the second polymer layer 106 may be heat-cured, UV-cured, and/or the like. The process may further include removing the one or more mold frames 208, as shown in FIG. 2B, and by reference number 216.

In some implementations, the process to assemble the diffusive optical device 100 includes attaching a polymer to a substrate via an adhesive layer. For example, as shown in FIG. 2B, and by reference number 218, the second polymer layer 106 may be bonded to the substrate 102 by disposing the second polymer layer 106 on the first polymer layer 104 (e.g., that was formed according to the process described in relation to FIG. 2A), which is disposed on the substrate 102. The process may further include curing the adhesive layer to cause the polymer to bond to the substrate via the adhesive layer. For example, as shown in FIG. 2B, and by reference number 220, the first polymer layer 104 may be heat-cured, UV-cured, and/or the like. The process may further include removing the mold 206. For example, as shown in FIG. 2B, and by reference number 222, the mold 206 may be removed from the second polymer layer 106 (e.g., such that non-uniform surface of the second polymer layer 106 interfaces with free space). Accordingly, the second polymer layer 106 may be formed and disposed on the first polymer layer 104, which is disposed on the substrate 102. In this way, the diffusive optical device 100 may be assembled to comprise the substrate 102, the first polymer layer 104, and the second polymer layer 106. Because the process includes discrete steps, one or more of the steps may be performed using an assembly line process (e.g., that utilizes a conveyor belt or other efficiency improvement tools) to form the second polymer layer 106 and to assemble the diffusive optical device 100.

As indicated above, FIGS. 2A-2B are provided as an example. Other examples may differ from what is described with regard to FIGS. 2A-2B.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A diffusive optical device, comprising:
   a glass substrate;
   a first polymer layer disposed on a first surface of the glass substrate,
      wherein:
         the first polymer layer includes a plurality of adhesion promoter molecules, and
         the plurality of adhesion promoter molecules include at least one adhesion promoter molecule that includes a molecularly flexible spacer; and
   a second polymer layer disposed on the first polymer layer,
      wherein:
         a refractive index of the first polymer layer is different than a refractive index of the second polymer layer, and
         a non-uniform surface of the second polymer layer is configured to interface with free space.

2. The diffusive optical device of claim 1,
   wherein one or more coatings are disposed on a second surface of the glass substrate, and
   wherein the one or more coatings include at least one of:
      an electrically conductive coating; or
      an anti-reflective coating.

3. The diffusive optical device of claim 1, wherein the refractive index of the first polymer layer is greater than the refractive index of the second polymer layer.

4. The diffusive optical device of claim 1,
   wherein the at least one adhesion promoter molecule further includes one or more molecules from an alkoxysilane group, and
   wherein the molecularly flexible spacer comprises a molecule from:
      an alkyl group;
      a siloxane group; or
      an alkenyl group.

5. The diffusive optical device of claim 1,
   wherein the first polymer layer comprises a plurality of regions, and
   wherein:
      a first region, of the plurality of regions, is configured to pass light associated with a first wavelength range; and
      a second region, of the plurality of regions, is configured to pass light associated with a second wavelength range.

6. The diffusive optical device of claim 1,
   wherein the first polymer layer comprises a plurality of regions, and
   wherein:
      a first region, of the plurality of regions, is configured to cause light that passes through the first region to have a first polarity; and
      a second region, of the plurality of regions, is configured to cause light that passes through the second region to have a second polarity.

7. The diffusive optical device of claim 1,
   wherein the first polymer layer comprises a plurality of regions, and
   wherein:

a first region, of the plurality of regions, is configured to cause light that passes through the first region to have a light intensity within a first light intensity range; and a second region, of the plurality of regions, is configured to cause light that passes through the second region to have a light intensity within a second light intensity range.

8. The diffusive optical device of claim 1,
wherein the first surface of the glass substrate has a first area, and
wherein the first polymer layer covers a region of the first surface of the glass substrate that has a second area that is less than the first area.

9. A diffusive optical device, comprising:
a glass substrate;
a first polymer layer disposed on a first surface of the glass substrate; and
a second polymer layer disposed on the first polymer layer, wherein:
the first polymer layer includes a plurality of adhesion promoter molecules,
the plurality of adhesion promoter molecules include at least one adhesion promoter molecule that includes a molecularly flexible spacer,
a refractive index of the first polymer layer is different than a refractive index of the second polymer layer,
a non-uniform surface of the second polymer layer is configured to interface with free space, and
the first surface of the glass substrate comprises a central region and a margin region.

10. The diffusive optical device of claim 9,
wherein one or more coatings are disposed on a second surface of the glass substrate, and
wherein the one or more coatings include at least one of:
an electrically conductive coating; or
an anti-reflective coating.

11. The diffusive optical device of claim 9, wherein the refractive index of the second polymer layer is greater than the refractive index of the first polymer layer.

12. The diffusive optical device of claim 10, wherein the molecularly flexible spacer comprises a molecule from:
an alkyl group;
a siloxane group; or
an alkenyl group.

13. The diffusive optical device of claim 9,
wherein the first polymer layer comprises a plurality of regions, and
wherein:
a first set of regions, of the plurality of regions, is configured to pass light associated with a first wavelength range; and
a second set of regions, of the plurality of regions, is configured to pass light associated with a second wavelength range.

14. The diffusive optical device of claim 9,
wherein the first polymer layer comprises a plurality of regions, and
wherein:
a first set of regions, of the plurality of regions, is configured to cause light that passes through the first set of regions to have a first polarity; and
a second set of regions, of the plurality of regions, is configured to cause light that passes through the second set of regions to have a second polarity.

15. The diffusive optical device of claim 9,
wherein the first polymer layer comprises a plurality of regions, and
wherein:
a first set of regions, of the plurality of regions, is configured to cause light that passes through the first set of regions to have a light intensity within a first light intensity range; and
a second set of regions, of the plurality of regions, is configured to cause light that passes through the second set of regions to have a light intensity within a second light intensity range.

16. The diffusive optical device of claim 9, wherein the first polymer layer is disposed on the central region and not the margin region.

17. A device, comprising:
a substrate;
a first polymer layer disposed on a surface of the substrate; and
a second polymer layer disposed on the first polymer layer,
the first polymer layer including a plurality of adhesion promoter molecules,
the plurality of adhesion promoter molecules including at least one adhesion promoter molecule that includes a molecularly flexible spacer,
a refractive index of the first polymer layer being different than a refractive index of the second polymer layer, and
the second polymer layer including a non-uniform surface that interfaces with free space.

18. The device of claim 17, wherein the non-uniform surface is a jagged top surface of the second polymer layer.

19. The device of claim 17, wherein the first polymer layer includes a different non-uniform surface that is configured to facilitate diffraction of light that propagates from the different non-uniform surface to the second polymer layer.

20. The device of claim 17, wherein the surface of the substrate comprises a central region and a margin region, and
wherein the first polymer layer is disposed on the central region and not the margin region.

* * * * *